US005501864A

United States Patent [19]

Song et al.

[11] Patent Number: 5,501,864
[45] Date of Patent: Mar. 26, 1996

[54] METHOD OF MAKING SUGAR-CONTAINING CHEWING GUM WITH PROLONGED SWEETNESS INTENSITY

[75] Inventors: Joo H. Song, Northbrook; Kevin B. Broderick, Berwyn, both of Ill.

[73] Assignee: Wm. Wrigley Jr. Company, Chicago, Ill.

[21] Appl. No.: 242,301

[22] Filed: May 13, 1994

Related U.S. Application Data

[63] Continuation-in-part of Ser. No. 226,667, Apr. 12, 1994, Pat. No. 5,415,880.

[51] Int. Cl.$^6$ ............................................. A23G 3/30
[52] U.S. Cl. ........................................... 426/3; 426/5
[58] Field of Search .................................. 426/3–6, 658, 426/548

[56] References Cited

U.S. PATENT DOCUMENTS

| | | | |
|---|---|---|---|
| 2,288,100 | 6/1942 | Manson | 99/135 |
| 2,413,239 | 12/1946 | Manson et al. | 260/4 |
| 2,504,436 | 4/1950 | McCoubrey et al. | 260/89.1 |
| 2,519,775 | 8/1950 | Lougovoy | 99/135 |
| 2,704,753 | 3/1955 | Monaghan | 260/89.1 |
| 3,984,574 | 10/1976 | Comollo | 426/4 |
| 4,188,406 | 2/1980 | Sarkisian et al. | 426/3 |
| 4,352,822 | 10/1982 | Cherukuri et al. | 426/4 |
| 4,357,355 | 11/1982 | Koch et al. | 426/4 |
| 4,452,820 | 6/1984 | D'Amelia et al. | 426/3 |
| 4,490,395 | 12/1984 | Cherukuri et al. | 426/3 |
| 4,525,363 | 6/1985 | D'Amelia et al. | 426/3 |
| 4,721,620 | 1/1988 | Cherukuri et al. | 426/6 |
| 4,794,003 | 12/1988 | Cherukuri et al. | 426/6 |
| 4,915,958 | 4/1990 | Faust et al. | 426/3 |
| 4,933,189 | 6/1990 | Cherukuri et al. | 426/3 |
| 4,986,991 | 1/1991 | Yatka et al. | 426/3 |
| 5,057,327 | 10/1991 | Yatka et al. | 426/3 |
| 5,057,328 | 10/1991 | Cherukuri et al. | 426/5 |
| 5,082,671 | 1/1992 | Cherukuri | 426/3 |
| 5,106,632 | 4/1992 | Wong et al. | 426/3 |
| 5,110,608 | 5/1992 | Cherukuri et al. | 426/3 |
| 5,116,626 | 5/1992 | Synosky et al. | 426/3 |
| 5,133,977 | 7/1992 | Patel | 426/3 |
| 5,139,787 | 8/1992 | Broderick et al. | 424/486 |
| 5,139,793 | 8/1992 | Johnson et al. | 426/3 |
| 5,139,794 | 8/1992 | Patel et al. | 426/3 |
| 5,158,790 | 10/1992 | Witkewitz et al. | 426/3 |
| 5,266,336 | 11/1993 | McGrew et al. | 426/4 |
| 5,286,501 | 2/1994 | Song et al. | 426/3 |
| B1 4,352,822 | 9/1985 | Cherukuri et al. | 426/4 |

FOREIGN PATENT DOCUMENTS

| | | |
|---|---|---|
| 1007107 | 8/1973 | Canada . |
| 2027177 | 4/1991 | Canada . |
| 0066864 | 12/1982 | European Pat. Off. . |
| 0242325 | 10/1987 | European Pat. Off. . |
| 0453397 | 3/1991 | European Pat. Off. . |
| 0453402 | 10/1991 | European Pat. Off. . |
| 0485170 | 5/1992 | European Pat. Off. . |
| 49-042855 | 4/1974 | Japan . |
| 9147828 | 5/1985 | Japan ........................ A23G 3/30 |
| 61-56979 | 12/1986 | Japan ........................ A23G 3/30 |
| 2-245139 | 9/1990 | Japan ........................ A23G 3/30 |
| 84/5846 | 7/1984 | South Africa . |
| 2159384 | 12/1985 | United Kingdom ........... A23G 3/00 |
| 2226745 | 7/1990 | United Kingdom ........... A23G 3/30 |
| 90-08478 | 8/1990 | WIPO ........................... A23L 1/187 |

OTHER PUBLICATIONS

Billmeyer—*Textbook Of Polymer Science,* Second edition (1971), pp. 24–26.
Brandrup & Immergut—*Polymer Handbook,* Third edition (1989), pp. VII–519–VII–559.

*Primary Examiner*—Jeanette Hunter
*Attorney, Agent, or Firm*—Maxwell J. Petersen; Willian Brinks Hofer Gilson & Lione

[57] ABSTRACT

A sugar-sweetened chewing gum is provided having enhanced long-term sweetness intensity during chewing, which is provided by the sugar. The sugar included in the chewing gum is at least 60% as sweet as sucrose. Water is provided in a sufficient quantity to dissolve and/or mix with at least some of the sugar. A mildly hydrophilic polymer attractor is provided which attracts the water mixed with sugar and temporarily delays the release of the water mixed with sugar during chewing. Surprisingly, the gum of the invention has enhanced long term flavor release provided by the sugar, without compromising the pleasing initial burst of sweetness, which is also provided by the sugar.

26 Claims, 2 Drawing Sheets

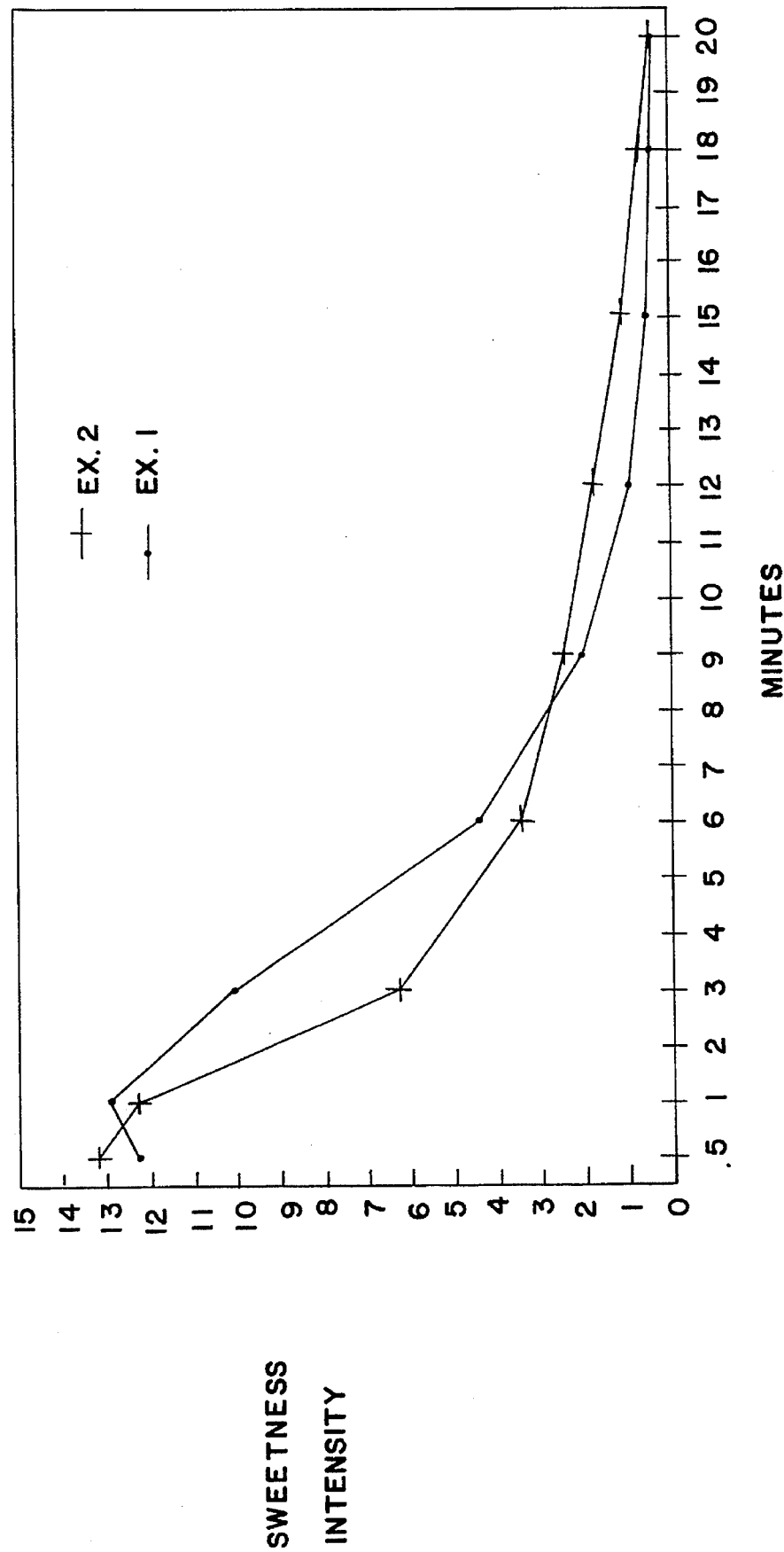

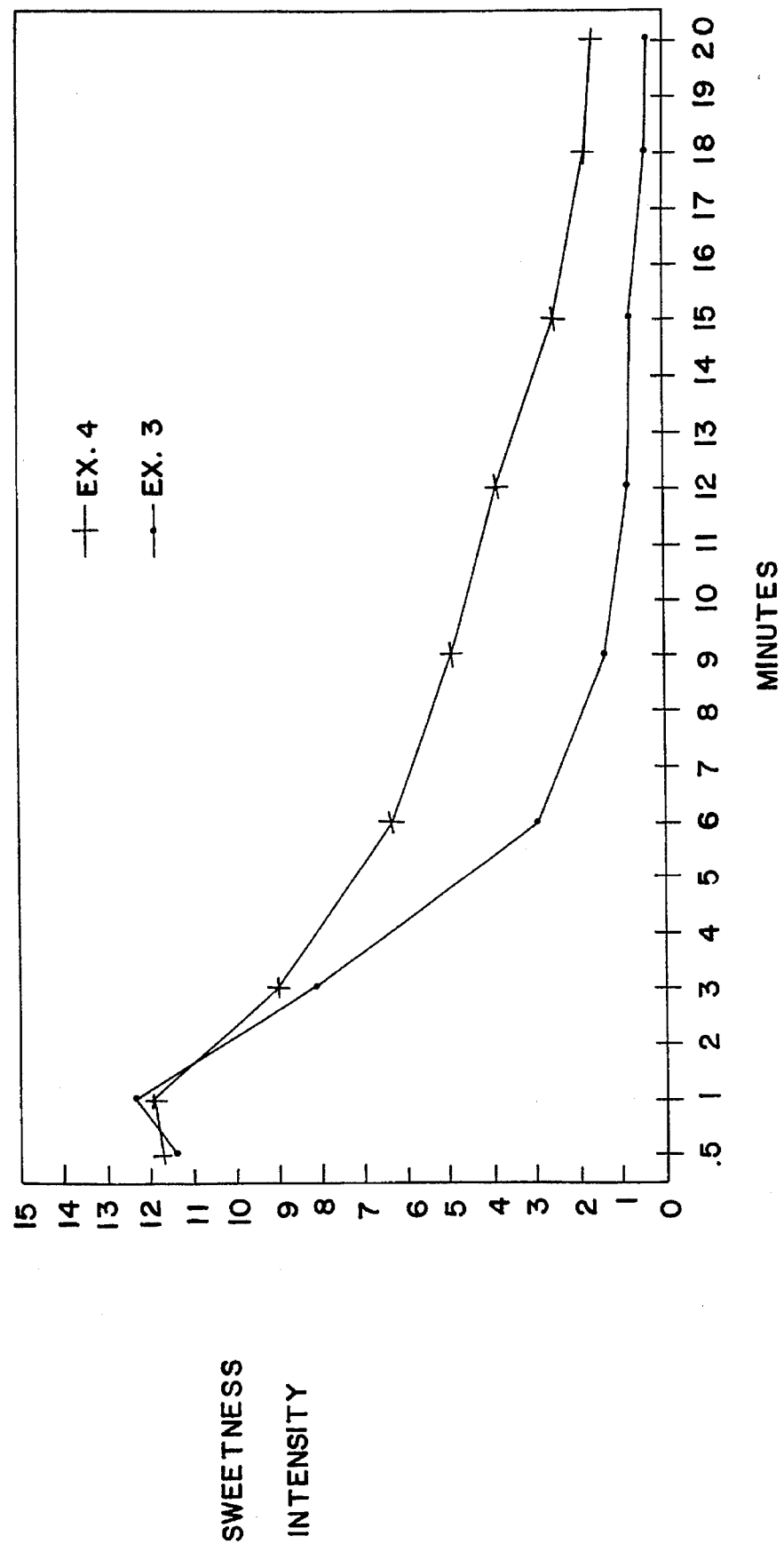

METHOD OF MAKING SUGAR-CONTAINING CHEWING GUM WITH PROLONGED SWEETNESS INTENSITY

RELATED APPLICATIONS

This application is a continuation-in-part of U.S. patent application Ser. No. 08/226,667, filed on Apr. 12, 1994 now U.S. Pat. No. 5,415,880, entitled "Fruit Flavored Chewing Gum With Prolonged Flavor Intensity", the entire disclosure of which is incorporated herein by reference.

FIELD OF THE INVENTION

This invention relates to a method of enhancing the sweetness of a sugar-containing chewing gum after several minutes of chewing. This invention also includes a sugar-containing chewing gum product having enhanced long-term sweetness intensity.

BACKGROUND OF THE INVENTION

Due to the demand for lower calorie and anti-caries chewing gum products, considerable effort has been directed toward the development of sugarless chewing gums containing high intensity sweeteners and other non-sugar sweeteners. Along with these efforts, considerable work has been done to adjust the flavor and sweetness profiles of these sugarless chewing gums. This work has included the development of compatibilizing agents, enhancing agents, encapsulation techniques, blending techniques and other methods of optimizing flavor and sweetness.

Because of the trend towards sugarless gums, comparatively less effort has been devoted to improving and/or optimizing the sweetness of sugar-containing gums, defined herein as chewing gums whose sweetness depends in whole, or in part, on the presence of sugar. However, there are still many chewing gums in which the presence of sugar plays an important role in sweetening the gum. Many bubble gums and pellet gums, and some standard chewing gums, still contain sugar. Some consumers prefer the use of natural sugars over high intensity sweeteners, which are synthetic.

Because of its high solubility in water, sugar has a tendency to release very rapidly into the mouth during chewing of the sugar-containing gums. Therefore, gums whose sweetness depends primarily on sugar tend to lose their sweetness rapidly, i.e., during the first 7–10 minutes of chewing. This problem has been addressed in the prior art, to an extent, by adding high intensity sweeteners having delayed flavor release (for example, encapsulated or spray-dried high intensity sweeteners) to sugar-containing gums. However, little has been done to modify the release of the sugar, or to enhance the long-term sweetness contributed by the sugar.

In order to provide a pleasing, long-lasting sweetness to a sugar-containing gum, it is generally desirable to prolong the time period during which at least 15% of the original sweetness intensity is apparent to the consumer. In other words, the consumer initially detects a sweetness burst of a relatively high intensity when chewing is commenced. Thereafter, the detected sweetness intensity inevitably declines with time during chewing. When the detected sweetness intensity decreases by more than 85% from the original level, the gum may acquire a flat or bitter taste and is less pleasant to chew. Therefore, the enjoyable sweetness period can be prolonged by increasing the time during which at least 15% of the original sweetness intensity is apparent.

SUMMARY OF THE INVENTION

The present invention is a sugar-containing chewing gum which has enhanced long-term sweetness provided by the sugar. The term "sugar" is defined herein as including sucrose, dextrose, fructose, maltose, dried invert sugar, and other saccharide-containing compounds which are at least about 60% as sweet as sucrose. Notably, the present invention achieves the objective of enhanced long-term sweetness provided by the sugar, without sacrificing the initial sweetness burst, which is also provided by the sugar.

In addition to sugar, the present invention prefers the presence of enough water in the chewing gum to dissolve or attach a significant amount of the sugar. Therefore, the invention is preferably directed to high moisture-containing sugar-containing gums which include at least about 2.0% by weight moisture, and most preferably more. Alternatively, the needed moisture may be provided from the water in the mouth during chewing. It is not essential that all of the sugar be dissolved in the moisture. However, only that portion of the sugar which is dissolved or attached to the moisture is likely to contribute to the long-term sweetness enhancement achieved with the invention. In addition to sugar and a sufficient amount of water, the present invention also requires the presence of a mildly hydrophilic polymer attractor for the water. The term "mildly hydrophilic" means a polymer which has enough hydrophilic character to temporarily attract and restrain the water mixed with the sugar during chewing, but which is not so hydrophilic as to permanently absorb or restrain the water mixed with the sugar. For purposes of the present invention, the mildly hydrophilic polymer attractor preferably includes medium to high molecular weight polyvinyl acetate having a number average molecular weight of at least about 30,000.

Finally, the chewing gum of the invention does not require the presence of a modified high intensity sweetener to provide enhanced long-term sweetness. This is because the mildly hydrophilic polymer attractor temporarily restrains enough of the water mixed with sugar that some of the sugar sweetness is released later in the chewing process. This restraining effect occurs regardless of whether the water is initially present in the chewing gum, or is supplied from the mouth during chewing. Surprisingly, the present invention maintains the integrity of the initial sweetness burst provided by the sugar, while at the same time changing the rate of sweetness dissipation so that the chewing gum maintains at least 15% of its original apparent sweetness intensity provided by the sugar over a longer period of time.

Generally, the invention will prolong the period during which at least 15% of the original sweetness is apparent during chewing, by at least one minute, and more often by two or more minutes, compared to conventional sugar-containing chewing gums. This means that the period of enjoyable sweetness, during which the sweetness intensity remains at or above 15% of the original sweetness intensity, can now be increased to about 9–15 minutes, compared to a previous range of about 7–10 minutes, without adding modified high intensity sweeteners, without increasing the amount of sugar added to the gum, and without lowering the intensity of the initial sweetness burst. Still longer periods of enjoyable sweetness can be achieved by increasing the amount of moisture in the gum, by increasing the amount or molecular weight of the mildly hydrophilic polymer attractor, and/or by adding a modified high intensity sweetener known in the art.

With the foregoing in mind, it is a feature and advantage of the invention to provide a sugar-sweetened chewing gum having an enjoyable sweetness period at least one minute longer, and often two or more minutes longer, than the enjoyable sweetness period of a conventional sugar-sweetened chewing gum containing the same level and type of sugar.

It is also a feature and advantage of the invention to provide a sugar-sweetened chewing gum whose long-term sweetness is enhanced without significantly affecting the intensity of the initial sweetness burst provided by the sugar.

It is also a feature and advantage of the invention to provide a method of making a sugar-sweetened gum with enhanced long-term flavor intensity which does not require the addition of a modified high-intensity sweetener, i.e., which enhances the long-term sweetness provided by the sugar.

It is also a feature and advantage of the invention to provide the chewing gum manufacturer with a variety of parameters that can be changed or adjusted for the effect of enhancing the long-term sweetness intensity of a sugar-sweetened chewing gum.

The foregoing and other features and advantages of the invention will become further apparent from the following detailed description of the presently preferred embodiments, read in conjunction with the accompanying examples and drawings. The detailed description, examples and drawings are merely illustrative rather than limiting, with the scope of the invention being defined by the appended claims and equivalents thereof.

BRIEF DESCRIPTION OF THE FIGURES

FIG. 1 shows the sweetness intensity as a function of chewing time for a conventional sugar-sweetened chewing gum versus a sugar-sweetened chewing gum of the invention, using equal starting levels of sugar. FIG. 1 corresponds to the samples described in Examples 1 and 2.

FIG. 2 shows the sweetness intensity as a function of time for a conventional sugar-sweetened chewing gum versus another sugar-sweetened chewing gum of the invention. FIG. 2 corresponds to the samples described in Examples 3 and 4.

DETAILED DESCRIPTION OF THE PRESENTLY PREFERRED EMBODIMENTS

Hydrophilic materials have a tendency to attract and/or absorb moisture. Materials which are highly hydrophilic may absorb so much moisture that the hydrophilic material dissolves in the moisture. Materials which are hydrophobic, on the other hand, repel moisture. Between the two extremes are materials which can be called "mildly hydrophilic", i.e., materials which can attract and restrain some moisture without being dissolved or otherwise materially changed in state.

Polyvinyl acetate having a number average molecular weight of at least about 30,000, is one such mildly hydrophilic material. Due in part to hydrogen bonding, the acetate groups attract some moisture. However, the polymer does not dissolve in water and the amount of water absorbed is not sufficient to materially change the state of the polymer.

While not wishing to be bound by theory, it is believed the polyvinyl acetate having a number average molecular weight of at least about 30,000 not only attracts moisture but also protects or "restrains" the moisture for a period of time during chewing. This is because the polyvinyl acetate molecules are sufficiently long that they become twisted and turned, entangled and wrapped, thereby offering a greater temporary protection of water molecules attached thereto, during chewing. As stated above, the water may be part of the initial chewing gum composition, or may be provided during chewing.

In other words, water mixed with sugar that is attached to the polyvinyl acetate prior to or during chewing, will only gradually be released during chewing as the polyvinyl acetate molecules twist, turn, unwrap and rewrap, thereby exposing attached water mixed with sugar to the water in the mouth. In the early stages of chewing, sugar is more concentrated within the saliva moisture and becomes readily intermixed with, and attached to, the polyvinyl acetate. As more moisture is supplied during chewing, the sugar slowly leaches out of the moisture held by the polyvinyl acetate, causing a delayed sweetness sensation.

For purposes of the invention, it is preferred that the polyvinyl acetate has a number average molecular weight between about 30,000–80,000. Although higher molecular weight polyvinyl acetate can be used, this may require the use of a plasticizer to prevent undue stiffening of the chewing gum. Plasticizers, for example, glycerol triacetate, are also attracted to the polyvinyl acetate, and may interfere with the attraction between polyvinyl acetate and the water/sugar mixture.

In order to provide the desired long-term sweetness enhancement, the sugar-sweetened gum of the invention should include at least about 7% by weight of polyvinyl acetate having a number average molecular weight of at least about 30,000 (herein referred to as medium to high molecular weight polyvinyl acetate). Preferably, the sugar-sweetened gum of the invention will include at least about 9% by weight medium to high molecular weight polyvinyl acetate, most preferably at least about 11% by weight medium to high molecular weight polyvinyl acetate.

In addition to the mildly hydrophilic polymer attractor (e.g. the medium to high molecular weight polyvinyl acetate), the sugar-sweetened chewing gum of the invention may initially include a relatively high amount of moisture in order to mix with and "carry" enough sugar that the long-term sweetness intensity is noticeably enhanced. The moisture can be provided by any humectant component of the chewing gum, for example, water-containing softeners and sweetener solutions, or may be added later during chewing. Typical sugars are highly soluble in water, meaning that water can be highly absorbed into sugar. Therefore, a given quantity of water can mix with and carry a much larger amount of sugar. Nevertheless, it is preferred that the sugar-sweetened chewing gum of the invention initially include at least about 2.0% by weight water, more preferably at least about 2.5% by weight water, most preferably at least about 3.0% by weight water.

The sugar component may be any conventional or naturally occurring sugar that is at least about 60% as sweet as sucrose. Examples of suitable sugars include sucrose, dextrose, fructose, maltose, dried invert sugar and the like, and mixtures thereof. While sugars having lower sweetness may be present, they are not material to the invention. Sugars which are less than about 60% as sweet as sucrose will not materially enhance the long-term sweetness of the gum, because they are not very sweet to begin with. Sucrose is the most preferred sugar component.

The sugar component may be present at about 10–90% by weight of the chewing gum, preferably about 20–80% by weight of the chewing gum, most preferably about 30–60% by weight of the chewing gum. It is not intended that all of the sugar will become attached to the chewing gum moisture or be restrained by the mildly hydrophilic polymer attractor. To the contrary, some of the sugar should remain unattached in order to provide the pleasing initial sweetness burst during chewing. Instead, only enough sugar needs to be carried by the water, and restrained by the mildly hydrophilic polymer attractor, to provide the desired long-term sweetness enhancement. The amount of sugar which is carried and restrained generally increases with the amounts of water and polyvinyl acetate in the chewing gum.

As stated above, the chewing gum of the invention has enhanced long-term sweetness during chewing which is provided by the sugar, in addition to a pleasing initial sweetness burst which is also provided by the sugar. In other words, modified high intensity sweeteners and other artificial sweeteners used in the prior art to provide enhanced long-term sweetness, are not essential to the invention. Modified high intensity sweeteners, for example, spray-dried or encapsulated high intensity sweeteners, may be used in the chewing gum of the invention, but are not necessary. If desired, the chewing gum of the invention can be free, or substantially free, of all artificial sweeteners. On the other hand, the use of high intensity sweeteners in combination with the enhanced long-term sugar sweetness of the invention has been found to improve the taste of artificial sweeteners, masking bitter or metallic off-tastes that often result when artificial sweeteners function alone.

The sugar-sweetened chewing gum of the invention generally includes a water soluble bulk portion, a water insoluble chewing gum base portion, a mildly hydrophilic polymer attractor (generally included in the gum base), and one or more flavoring agents. The water soluble portion dissipates over a period of time during chewing. The gum base portion and polymer attractor are retained in the mouth throughout the chewing process.

The insoluble gum base generally includes elastomers, resins, fats, oils, waxes, and inorganic fillers. The elastomers may include polyisobutylene, isobutylene-isoprene copolymer, styrene butadiene rubber and natural latexes such as chicle. The resins may include polyvinyl acetate, terpene resins, and rosin esters. Medium to high molecular weight polyvinyl acetate (average M.W.=30,000–80,000) is a preferred resin, with an average molecular weight of 40,000–50,000 being most preferred. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; gum base softeners, including glycerol monostearate and lecithin; and optional ingredients such as antioxidants, colors and emulsifiers. In accordance with the invention, gum base softeners (i.e. plasticizers) should be kept to a minimum or eliminated when, as with polyvinyl acetate, they may hinder the performance of the mildly hydrophilic polymer attractor. The gum base constitutes between 10–95% by weight of the chewing gum composition, more typically 10–50% by weight of the chewing gum, and most commonly 20–30% by weight of the chewing gum. When the mildly hydrophilic polymer attractor is included in the gum base, the gum base must be present in an amount sufficient to ensure that the polymer attractor constitutes at least about 7% by weight of the chewing gum, preferably at least about 9% by weight of the chewing gum, most preferably at least about 11% by weight of the chewing gum, as explained above.

The water soluble portion of the chewing gum may include chewing gum softeners, bulk sweeteners, high intensity sweeteners, fruit flavoring agents and combinations thereof. Chewing gum softeners are added to the chewing gum in order to optimize the chewability and mouth feel of the gum. When used, the softeners generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sugar sweeteners which are at least 60% as sweet as sucrose constitute between 10–90% by weight of the chewing gum, more typically 20–80% by weight of the chewing gum and most commonly 30–60% by weight of the chewing gum. Sugar sweeteners may include saccharide containing components including but not limited to sucrose, dextrose, maltose, dried invert sugar, fructose, and the like, alone or in combination. Other sugar sweeteners and/or sugarless sweeteners may also be included, but are not required by the invention. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may optionally be present in addition to the sugar sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in the chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Natural or artificial flavoring agents and components may be used in the chewing gum of the invention. Natural and artificial flavoring agents may be combined in any sensorially acceptable fashion.

Optional ingredients such as colors, emulsifiers, pharmaceutical agents and additional flavoring agents may also be included in chewing gum.

The chewing gum of the invention is generally manufactured by sequentially adding the various chewing gum ingredients to any commercially available mixer known in the art. After the ingredients have been thoroughly mixed, the gum mass is discharged from the mixer and shaped into the desired form such as by rolling into sheets, scoring and cutting into sticks. Generally, the ingredients are mixed by first melting the gum base and adding it to the running mixer. The gum base may alternatively be melted in the mixer. Color and emulsifiers can be added at this time.

A chewing gum softener such as glycerin can be added next along with syrup and part of the bulk portion. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

As stated above, the mildly hydrophilic polymer attractor may be added initially into the chewing gum base, or later added during manufacture of the chewing gum. When medium to high molecular weight polyvinyl acetate is used as the polymer attractor, it should be added during manufacture of the gum base, in the middle or near the front of the otherwise conventional mixing cycle, with the elastomer and filler. Once the polyvinyl acetate has been dispersed, the remaining gum base ingredients (emulsifiers, etc.) can be added. Typically, a sigma blade batch mixer can be used to make the gum base.

A wide range of changes and modifications to the embodiments of the invention described above will be apparent to persons skilled in the art. The following examples are not to be construed as imposing limitations on the invention, but are included merely to illustrate preferred embodiments.

EXAMPLE 1 (COMPARATIVE)

This Example illustrates the preparation of a conventional sugar-sweetened gum, using sucrose sugar.

Initially, a conventional gum base was prepared using the following formulation:

| Ingredient | % By Weight In Gum Base |
| --- | --- |
| Isobutylene-isoprene copolymer | 10.1 |
| Polyisobutylene | 1.6 |
| Terpene resin | 26.9 |
| Low M.W. polyvinyl acetate (mol. wt. = 25,000) | 27.3 |
| Paraffin wax | 6.9 |
| Lecithin | 2.7 |
| Glycerol monostearate | 4.8 |
| Microcrystalline waxes | 6.4 |
| Hydrogenated vegetable oil | 2.0 |
| Calcium carbonate | 11.2 |
| Color | 0.1 |
| TOTAL | 100.00 |

When making the above gum base, a conventional mixing procedure was employed. A Werner-Pfleiderer production mixer was used to produce a 750-lb batch at 115° C. using a drive speed of 252 rpm and a steam pressure of 45 psi. The total mixing time was 2.5 hours. The following table shows when and how much of each ingredient was added during the mixing cycle. Note that the polyvinyl acetate was not added early in the cycle, in the conventional process, and the polyvinyl acetate had an average molecular weight of only 25,000.

| Ingredient | % Added | Time of Addition During Mixing Cycle |
| --- | --- | --- |
| Isobutylene-isoprene copolymer (ground) | 10.1 | 0:00 |
| Polyisobutylene | 1.6 | 0:00 |
| Calcium carbonate | 11.2 | 0:00 |
| Color | 0.1 | 0:00 |
| Terpene resin | 2.96 | 0:00 |
| Terpene resin | 2.96 | 0:30 |
| Terpene resin | 5.92 | 0:40 |
| Terpene resin | 7.53 | 0:50 |
| Terpene resin | 7.53 | 1:00 |
| Low M.W. polyvinyl acetate (mol. wt. = 25000) | 7.06 | 1:10 |
| Low M.W. polyvinyl acetate (mol. wt. = 25000) | 10.12 | 1:20 |
| Low M.W. polyvinyl acetate (mol. wt. = 25000) | 10.12 | 1:30 |
| Paraffin wax | 6.9 | 2:00 |
| Lecithin | 2.7 | 2:00 |
| Glycerol monostearate | 4.8 | 2:00 |
| Microcrystalline wax | 6.4 | 2:00 |
| Hydrogenated vegetable oil | 2.0 | 2:00 |
| TOTAL | 100.0 | 2:30 |

Next, a conventional sugar-sweetened chewing gum was prepared using the conventional base, according to the following formulation. Note that the amount of polyvinyl acetate in the resulting chewing gum (6.55%, or 27.3% of the base) is less than the 7% minimum required for the invention. However, the moisture content of 2.1% was higher than the preferred 2.0% minimum.

| Ingredient | % By Weight In Chewing Gum |
| --- | --- |
| Conventional base | 24.0 |
| Glycerin (5% moisture) | 1.15 |
| Glucose syrup (80% solids) | 7.30 |
| Sugar (Sucrose) | 58.14 |
| Dextrose monohydrate (92% solids) | 7.28 |
| Lecithin | 0.13 |
| Free mixed fruit flavor | 2.00 |
| TOTAL | 100.0 |

The conventional sugar-sweetened chewing gum of Example 1 was evaluated for sweetness intensity as a function of time by a panel of trained sensory experts. The panelists evaluated the gum at different chewing times on a scale between zero and 15, wherein zero means no sweetness intensity and 15 means very strong sweetness intensity.

The results of the evaluation are shown in FIG. 1. As shown, the conventional chewing gum exhibited an initial flavor burst during chewing of 12.3–13.0 sweetness intensity units (S.I.U.'s). The sweetness intensity then dissipated steadily, falling below 15% of its original level (or 1.9 S.I.U.'s) after about nine minutes of chewing. In other words, the conventional sugar-sweetened gum of Example 1 had an enjoyable sweetness period of about nine minutes.

EXAMPLE 2 (INVENTIVE)

This Example illustrates the preparation of an inventive sugar-sweetened gum, for comparison with Example 1, using the same sucrose sugar sweetener. Initially, a gum base was prepared using a polyvinyl acetate polymer attractor at a higher level, and a higher average molecular weight, than used in Example 1. The inventive gum base had the following formulation:

| Ingredient | % By Weight In Gum Base |
| --- | --- |
| Isobutylene-isoprene copolymer | 7.0 |
| Polyisobutylene | 3.0 |
| Terpene resin | 10.0 |
| Glycerol ester of hydrogenated rosin | 10.0 |
| Low M.W. polyvinyl acetate (mol. wt. = 25,000) | 15.0 |
| Medium M.W. polyvinyl acetate (mol. wt. = 40,000) | 20.0 |
| Lecithin | 5.0 |
| Glycerol monostearate | 10.0 |
| Calcium carbonate | 20.0 |
| TOTAL | 100.0 |

As shown above, the inventive gum base of Example 2 differed from the conventional base of Example 1 in several significant respects, including a) the use of a higher amount of polyvinyl acetate, b) the use of higher average molecular weight polyvinyl acetate, having an average molecular weight of more than 30,000 and c) the elimination of waxes, which act like gum base plasticizers. In order to prepare the gum base of Example 2, without using waxes or plasticizers, a different mixing procedure was also used. A Haake Rheocord 90 mixer was equipped with a 3000 E mixing bowl to produce a 450-gram batch at 115° C. and 40 rpm. The medium molecular weight polyvinyl acetate was added at the front of the mixing cycle, and the mixing cycle was shortened to 32 minutes. The following table shows when and how much of each ingredient was added at different times during the mixing cycle.

| Ingredient | % Added | Time of Addition During Mixing Cycle |
| --- | --- | --- |
| Medium M.W. polyvinyl acetate (ground) | 20.0 | 0:00 |
| Isobutylene-isoprene copolymer | 7.0 | 0:00 |
| Calcium carbonate | 20.0 | 0:00 |
| Terpene resin | 5.0 | 0:00 |
| Terpene resin | 5.0 | 0:05 |
| Low M.W. polyvinyl acetate (ground) | 15.0 | 0:05 |
| Glycerol ester of hydrogenated rosin | 5.0 | 0:08 |
| Glycerol ester of hydrogenated rosin | 5.0 | 0:10 |
| Polyisobutylene | 3.0 | 0:13 |
| Glycerol monostearate | 10.0 | 0:23 |
| Lecithin | 5.0 | 0:30 |
| TOTAL | 100.0 | 0:32 |

Next, an inventive sucrose sugar-sweetened chewing gum was prepared using the inventive base, according to the following formulation. The following formulation is the same as that used in preparing the gum of Example 1 except that the inventive base was substituted for the conventional base.

| Ingredient | % By Weight in Chewing Gum |
| --- | --- |
| Inventive base | 24.0 |
| Glycerin (5% moisture) | 1.15 |
| Glucose syrup (80% solids) | 7.30 |
| Sugar (sucrose) | 58.14 |
| Dextrose monohydrate (92% solids) | 7.28 |
| Lecithin | 0.13 |
| Free mixed fruit flavor | 2.00 |
| TOTAL | 100.0 |

Note that the inventive chewing gum of Example 2 contained a total of 8.4% by weight polyvinyl acetate polymer attractor, with an average molecular weight exceeding 30,000, and a total of 2.1% by weight moisture. In accordance with the invention, and unlike the gum of Example 1, this is higher than the minimum level of 7% polymer attractor and the preferred minimum of 2% moisture.

The inventive sugar-sweetened chewing gum of Example 2 was evaluated for sweetness intensity as a function of time in the same manner explained in Example 1. The results of this evaluation are shown in FIG. 1. As shown, the inventive chewing gum exhibited an initial sweetness burst of almost identical intensity to the sweetness burst achieved with the conventional gum of Example 1. However, the sweetness intensity of Example 2 dissipated at a different rate, and did not fall below 15% of its initial intensity level (about 1.9 S.I.U's) until almost twelve minutes of chewing. In other words, the inventive sugar-sweetened gum of Example 2 had an enjoyable sweetness period almost three minutes longer than that of the conventional sugar-sweetened gum of Example 1.

As shown in FIG. 1, the inventive gum of Example 2 actually exhibited a lower sweetness intensity than the conventional gum of Example 1 at intermediate chewing times of from 1 to 8 minutes. This is not considered a drawback to the invention because, as shown in the following Examples 3 and 4, the intermediate sweetness intensity of the inventive chewing gum can be greatly enhanced without increasing the initial sweetness burst, by further modifying the formulation.

EXAMPLE 3 (COMPARATIVE)

This Example illustrates the preparation of another conventional sugar-sweetened gum, using the same sucrose sugar sweetener.

Initially, a conventional gum base was prepared according to the following formulation:

| Ingredient | % By Weight In Gum Base |
| --- | --- |
| Isobutylene-isoprene copolymer | 10.1 |
| Polyisobutylene | 1.6 |
| Terpene resins | 26.9 |
| Low M.W. polyvinyl acetate (mol. wt. = 25,000) | 27.3 |
| Lecithin | 2.7 |
| Glycerol monostearate | 4.8 |
| Microcrystalline/paraffin wax | 13.3 |
| Hydrogenated vegetable oil | 2.0 |
| Calcium carbonate | 11.2 |
| Color/BHT | 0.1 |

| Ingredient | % By Weight In Gum Base |
|---|---|
| TOTAL | 100.0 |

As shown above, the gum base of Example 3 had essentially the same composition as the gum base of Example 1, described above. The gum base of Example 3 was also made using the same conventional procedure as the gum base of Example 1, described above.

Next, a conventional sugar-sweetened chewing gum was prepared using the conventional base, according to the following formulation. Note that the amount of polyvinyl acetate in the resulting chewing gum (5.19%, or 27.3% of the base) is less than the 7% minimum required for the invention. However, the moisture content of 2.7% was higher than the preferred 2.0% minimum.

| Ingredient | % By Weight In Chewing Gum |
|---|---|
| Conventional base | 19.0 |
| Glycerin (5% moisture) | 1.15 |
| Glucose syrup (85% solids) | 13.91 |
| Lecithin | 0.13 |
| Sugar (sucrose) | 57.72 |
| Dextrose monohydrate (92% solids) | 7.28 |
| Free mixed fruit flavor | 0.81 |
| TOTAL | 100.0 |

The conventional mixed fruit-flavored gum of Example 3 was evaluated for sweetness intensity as a function of time using the same procedure explained in regard to Examples 1 and 2. The results of the evaluation are shown in FIG. 2. As shown, the conventional gum of Example 3 exhibited an initial sweetness burst of 11.4–12.3 S.I.U.'s when chewing was commenced. Thereafter, the sweetness intensity dissipated steadily, falling below 15% of its original value (about 1.8 S.I.U.'s) after about eight minutes of chewing. In other words, the conventional sugar-sweetened gum of Example 3 had an enjoyable sweetness period of about eight minutes.

EXAMPLE 4 (INVENTIVE)

This Example illustrates the preparation of an inventive sucrose sugar-sweetened chewing gum, for comparison with Example 3, wherein the effects of additional formulation changes on the intermediate and long-term sweetness intensity were observed.

Initially, a gum base was prepared using a polyvinyl acetate polymer attractor at a higher level, and having a higher average molecular weight, than used in Example 3. The inventive gum base had the following formulation:

| Ingredient | % By Weight In Gum Base |
|---|---|
| Isobutylene-isoprene copolymer | 7.0 |
| Polyisobutylene | 3.0 |
| Terpene resin | 10.0 |
| Glycerol ester of wood rosin | 9.9 |
| Low M.W. polyvinyl acetate (mol. wt. = 25,000) | 14.5 |
| Medium M.W. polyvinyl acetate (mol. wt. = 40,000) | 20.0 |
| Lecithin | 5.0 |
| Glycerol monostearate | 10.0 |
| Calcium carbonate | 19.95 |
| Color | 0.6 |
| BHT | 0.05 |
| TOTAL | 100.0 |

As shown above, the inventive gum base of Example 4 differed from the conventional gum base of Example 3 in several significant respects including a) the use of a higher amount of polyvinyl acetate, b) the use of higher molecular weight polyvinyl acetate, having an average molecular weight exceeding 30,000, and c) the elimination of waxes, which act like plasticizers. The gum base of Example 4 was prepared on a production scale (758 lbs.) using a Werner-Pfleiderer mixer with a 252 rpm drive shaft speed, steam pressure of 45 psi, and a total mixing time of 2:00 hours. The following table shows when and how much of each ingredient was added at different times during the mixing cycle.

| Ingredient | % Added | Time of Addition During Mixing Cycle |
|---|---|---|
| Color | 0.6 | 0:00 |
| Calcium carbonate | 19.95 | 0:00 |
| Isobutylene-isoprene copolymer | 7.0 | 0:00 |
| Glycerol ester of wood rosin | 4.3 | 0:00 |
| Polyisobutylene | 3.0 | 0:00 |
| Terpene resin | 5.0 | 0:30 |
| Medium M.W. polyvinyl acetate (ground) | 10.0 | 0:45 |
| Medium M.W. polyvinyl acetate (ground) | 10.0 | 0:55 |
| Terpene resin | 5.0 | 1:05 |
| Low M.W. polyvinyl acetate (ground) | 14.5 | 1:15 |
| Glycerol ester of wood rosin | 5.6 | 1:25 |
| BHT | 0.05 | 1:40 |
| Glycerol monostearate | 10.0 | 1:40 |
| Lecithin | 5.0 | 1:40 |
| TOTAL | 100.0 | 2:00 |

Next, an inventive sucrose sugar-sweetened chewing gum was prepared using the inventive base. The following formulation is generally similar to that used to prepare the gum of Example 3 except that a) the inventive base was substituted in place of the conventional base, b) the amount of gum base was increased, c) the amount of free fruit flavor was increased, and d) the amount of glucose syrup was lowered to make up for the foregoing increases. Also, the lecithin was eliminated and a minor amount of encapsulated high intensity sweetener was added.

| Ingredient | % By Weight In Chewing Gum |
|---|---|
| Inventive base | 24.0 |
| Glycerin (5% moisture) | 1.15 |
| Glucose syrup (80% solids) | 7.30 |
| Sugar | 57.82 |
| Dextrose monohydrate (92% solids) | 7.28 |
| Free mixed fruit flavor | 2.00 |
| 20% Active encapsulated aspartame | 0.45 |
| TOTAL | 100.0 |

Note that the inventive chewing gum of Example 4 contained a total of 8.3% by weight polyvinyl acetate polymer attractor, and a total of 2.1% by weight moisture. In accordance with the invention, these are higher than the minimum level of 7% polymer attractor and the preferred minimum of 2% moisture.

The inventive fruit-flavored chewing gum of Example 4 was evaluated for sweetness intensity as a function of time and compared with Example 3. The results of the comparison are plotted in FIG. 3. As shown, the inventive gum of Example 4 had an initial sweetness burst about equal to that of Example 3. Thereafter, the gum of Example 4 exhibited much higher sweetness intensity than the gum of Example 3 throughout the entire twenty minutes of chewing. In fact, the gum of Example 4 did not approach or fall below 15% of its original intensity until after eighteen minutes of chewing.

Notably, the encapsulated aspartame did not contribute an off-taste at any time during the twenty minutes of chewing. Because the long-term sweetness provided by the sugar was enhanced, the aspartame never functioned alone to provide sweetness, without help from the sugar. As stated above, as long as the sugar provides some of the sweetness at all times during the chewing, the inclusion of additional high-intensity sweeteners will not cause the gum to have a bitter off-taste.

It should be appreciated that the products of the present invention are capable of being exhibited in the form of a variety of embodiments, only a few of which have been illustrated and described above. The invention may be embodied in other forms without departing from its spirit or essential characteristics. It will be appreciated that the addition of some other ingredients, process steps, materials or components not specifically included may have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A method of making a sugar-containing chewing gum having enhanced long-term sweetness provided by the sugar, comprising the steps of:

providing about 10–95% by weight of a chewing gum base including a mildly hydrophilic polymer attractor in sufficient quantity to constitute at least about 7% by weight of the chewing gum;

providing about 10–90% by weight sugar which is at least about 60% as sweet as sucrose;

providing one or more humectants in the chewing gum;

adding the ingredients to a mixer;

mixing some of the sugar with water to form a water/sugar mixture;

temporarily attaching at least some of the water/sugar mixture to the mildly hydrophilic polymer attractor; and blending the ingredients together to form chewing gum;

whereby the temporary attachment of the water/sugar mixture to the polymer attractor causes enhanced long-term sweetness during chewing.

2. The method of claim 1, wherein the mildly hydrophilic polymer attractor comprises polyvinyl acetate.

3. The method of claim 2, wherein the polyvinyl acetate has a number average molecular weight of at least about 30,000.

4. The method of claim 2, wherein the polyvinyl acetate has a number average molecular weight of about 30,000–80,000.

5. The method of claim 1, wherein the sugar comprises a compound selected from the group consisting of sucrose, dextrose, fructose, maltose, dried invert sugar, and mixtures thereof.

6. The method of claim 1, wherein the sugar comprises sucrose.

7. The method of claim 1, wherein the mildly hydrophilic polymer attractor constitutes at least about 9% by weight of the chewing gum.

8. The method of claim 1, wherein the mildly hydrophilic polymer attractor constitutes at least about 11% by weight of the chewing gum.

9. The method of claim 1, wherein the sugar constitutes about 20–80% by weight of the chewing gum.

10. The method of claim 1, wherein the sugar constitutes about 30–60% by weight of the chewing gum.

11. The method of claim 1, wherein the one or more humectants are provided in sufficient quantity to contribute at least about 2.0% by weight water to the chewing gum.

12. The method of claim 11, wherein the water constitutes at least about 2.5% by weight of the chewing gum.

13. The method of claim 11, wherein the water constitutes at least about 3.0% by weight of the chewing gum.

14. A method of making a sugar-sweetened chewing gum having enhanced long-term sweetness, comprising the steps of:

providing about 10–95% by weight of a chewing gum base;

providing a mildly hydrophilic polymer attractor in a sufficient quantity to prolong the enjoyable sweetness period by at least one minute compared to a conventional sugar-sweetened chewing gum;

adding the mildly hydrophilic polymer attractor to the chewing gum base;

adding about 10–90% by weight sugar-selected from the group consisting of sucrose, dextrose, fructose, maltose, dried invert sugar, and mixtures thereof;

adding one or more water-containing ingredients to the chewing gum;

adding about 0.1–15% by weight flavor; and blending the ingredients together to form chewing gum;

whereby some of the sugar mixes with water to form a water/sugar mixture whose release is delayed by the mildly hydrophilic polymer attractor.

15. The method of claim 14, wherein the mildly hydrophilic polymer attractor is added during manufacture of the chewing gum base.

16. The method of claim 14, wherein the mildly hydrophilic polymer attractor comprises medium to high molecular weight polyvinyl acetate.

17. The method of claim 14, wherein the one or more water-containing ingredients are added in sufficient quantity to contribute at least about 2.0% by weight water to the chewing gum.

18. The method of claim 17, wherein the water constitutes at least about 2.5% by weight of the chewing gum.

19. The method of claim 17, wherein the water constitutes at least about 3.0% by weight of the chewing gum.

20. A sugar-sweetened chewing gum having enhanced long-term sweetness, comprising the following ingredients:

about 10–95% by weight of a water-insoluble portion including a mildly hydrophilic polymer attractor in sufficient quantity to constitute at least 9% by weight of the chewing gum;

about 10–90% by weight sugar selected from the group consisting of saccharide-containing compounds which are at least about 60% as sweet as sucrose;

at least about 2.0% by weight water;

wherein some of the sugar is mixed with the water;

wherein at least some of the water mixed with sugar is temporarily attached to the mildly hydrophilic polymer attractor; and about 0.1–15% by weight of one or more flavoring agents.

21. The chewing gum of claim 20, wherein high intensity sweeteners are substantially absent from the chewing gum.

22. The chewing gum of claim 20, wherein one or more high intensity sweeteners are present but do not contribute a bitter off-taste during chewing.

23. The chewing gum of claim 20, comprising at least about 11% by weight of the mildly hydrophilic polymer attractor.

24. The chewing gum of claim 20, wherein the mildly hydrophilic polymer attractor comprises polyvinyl acetate having a number average molecular weight of at least about 30,000.

25. The chewing gum of claim 20, comprising at least about 2.5% by weight water.

26. The chewing gum of claim 20, comprising at least about 3.0% by weight water.

* * * * *

UNITED STATES PATENT AND TRADEMARK OFFICE
CERTIFICATE OF CORRECTION

PATENT NO. : 5,501,864
DATED : March 26, 1996
INVENTOR(S) : Joo H. Song et al.

It is certified that error appears in the above-indentified patent and that said Letters Patent is hereby corrected as shown below:

On the title page: Item [56]

In column 2, line 16, under "FOREIGN PATENT DOCUMENTS", delete "49-042855" and substitute --74-042855--.

In column 2, line 18, under "FOREIGN PATENT DOCUMENTS", delete "61-56979" and substitute --86-56979--.

In column 2, line 19, under "FOREIGN PATENT DOCUMENTS", delete "2-245139" and substitute --90-245139--.

Signed and Sealed this

Seventh Day of January, 1997

*Attest:*

BRUCE LEHMAN

*Attesting Officer*   *Commissioner of Patents and Trademarks*